United States Patent
Miyashita

(10) Patent No.: US 7,605,946 B2
(45) Date of Patent: Oct. 20, 2009

(54) PRINTING APPARATUS INCREASING BLACK DENSITY OF ONE COLOR OF TEXT OR GRAPHIC OBJECT

(75) Inventor: Takeshi Miyashita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 936 days.

(21) Appl. No.: 11/237,746

(22) Filed: Sep. 29, 2005

(65) Prior Publication Data

US 2006/0092443 A1    May 4, 2006

(30) Foreign Application Priority Data

Sep. 29, 2004  (JP)  ............... P2004-283960
Jul. 1, 2005  (JP)  ............... P2005-194052

(51) Int. Cl.
*H04N 1/58* (2006.01)
(52) U.S. Cl. .................. 358/1.9; 358/2.1; 358/3.27; 358/521; 358/532
(58) Field of Classification Search .............. 358/1.9, 358/2.1, 3.24, 3.27, 501, 518, 521, 529, 530, 358/532, 447, 462
See application file for complete search history.

(56) References Cited

U.S. PATENT DOCUMENTS

| | | | | | |
|---|---|---|---|---|---|
| 5,477,246 | A | * | 12/1995 | Hirabayashi et al. | 347/12 |
| 5,515,096 | A | * | 5/1996 | Fujimoto | 358/462 |
| 6,102,520 | A | * | 8/2000 | Terasawa | 347/43 |
| 7,268,914 | B2 | * | 9/2007 | Noguchi et al. | 358/1.9 |

FOREIGN PATENT DOCUMENTS

| | | |
|---|---|---|
| JP | 2001-16459 A | 1/2001 |
| JP | 2001-53975 A | 2/2001 |
| JP | 2002-252773 A | 9/2002 |
| JP | 2004-54143 A | 2/2004 |

\* cited by examiner

*Primary Examiner*—Scott A Rogers
(74) *Attorney, Agent, or Firm*—Sughrue Mion, PLLC

(57) ABSTRACT

A printing apparatus is adapted to receive print data specifying a color of an object to be printed with RGB values and specifying a type of the object as one of a text object, a graphic object and an image object. A print processor is operable to generate black image data from a set of the print data for one page, such that a black density value for one color of at least the text object is made greater than a black density value for the one color of the image object. A print engine is operable to perform monochrome printing with black toner in accordance with the black image data.

5 Claims, 6 Drawing Sheets

FIG. 3

| RGB VALUE | CONVENTIONAL | INVENTION |
|---|---|---|
| a | ABCDE | ABCDE |
| b | ABCDE | ABCDE |
| c | ABCDE | ABCDE |

PRINTING APPARATUS INCREASING BLACK DENSITY OF ONE COLOR OF TEXT OR GRAPHIC OBJECT

BACKGROUND OF THE INVENTION

The present invention relates to a printing apparatus.

In recent years, some commercially available color page printers determine whether or not pages to be printed by an application on a host include any color, and when color is determined to be included, perform color printing using C (cyan), M (magenta), Y (yellow), and K (black) toner, whereas when no color is determined to be included, perform monochrome printing using only the K toner.

Meanwhile, some monochrome laser printers perform monochrome printing using K toner even when data intended for transmission to a color page printer for RGB full color printing are transmitted to the monochrome laser printer. Additionally, some color page printers are configured to operate as a monochrome page printer when C, M, and Y toner cartridges are not mounted thereon. When data for RGB full-color printing are transmitted to such a color page printer, because the color page printer is unable to perform color printing, the print data are discarded after being read.

The above described color page printer, which is configured to operate as a monochrome page printer when the C, M, and Y toner cartridges are not mounted, can perform the same monochrome printing using the K toner as that performed by a monochrome laser printer which performs monochrome printing using the K toner even when the data intended for transmission to a color page printer for RGB full-color printing are transmitted to the monochrome laser printer.

However, when such a printer as described above (i.e., a printer which performs monochrome printing in accordance with print data in which colors of the respective objects are specified by RGB values) is caused to print a document, or the like, in which some texts are assigned pale colors, a resultant printed matter involves a problem that the texts assigned pale colors are difficult or impossible to recognize. Similarly, when a document on which a graphic image in pale color is printed, the resultant printed matter involves a problem that the presence of the graphic image is difficult (or impossible) to recognize.

More specifically, the reason why an existing printer produces a monochrome printed matter in which texts/graphic images, to which pale colors are assigned, are difficult to recognize is that the existing printer obtains K values; that is, the amount of K toner used in printing, on the basis of RGB values specified in print data in accordance with below equations (1) and (2) (equations for obtaining a brightness from RGB values). Consequently, a printing amount of the K toner calculated from the RGB values for a pale color becomes small.

$$\text{gray} = 0.299R + 0.587G + 0.114B \quad (1)$$

$$K = 1.0 - \text{gray} \quad (2)$$

SUMMARY OF THE INVENTION

It is therefore an object of the invention to provide a printing apparatus which can produce (print) a printed matter on which texts, or the like, in pale colors are printed in an easily-readable form.

In order to achieve the above object, according to the invention, there is provided a printing apparatus, adapted to receive print data specifying a color of an object to be printed with RGB values and specifying a type of the object as one of a text object, a graphic object and an image object, the printing apparatus comprising:

a print processor, operable to generate black image data from a set of the print data for one page, such that a black density value for one color of at least the text object is made greater than a black density value for the one color of the image object; and a print engine, operable to perform monochrome printing with black toner in accordance with the black image data.

The print engine may be operable to perform color printing with cyan toner, magenta toner, yellow toner and the black toner. Here, the monochrome printing is performed when a prescribed condition is satisfied.

The prescribed condition may be that at least one of the cyan toner, the magenta toner and the yellow toner is not available.

The black image data may be generated such that a black density value for one color of the graphic object is made greater than the black density value for the one color of the image object.

The print processor may generate RGB image data including information indicative of the type of the object for every pixel, prior to the generation of the black image data.

BRIEF DESCRIPTION OF THE DRAWINGS

The above objects and advantages of the present invention will become more apparent by describing in detail preferred exemplary embodiments thereof with reference to the accompanying drawings, wherein:

FIG. 3 is a table showing examples printed by a conventional printing apparatus and the printing apparatus of FIG. 1;

DETAILED DESCRIPTION OF THE EMBODIMENTS

Embodiments of the present invention will be described below in detail with reference to the accompanying drawings.

Figure 1:
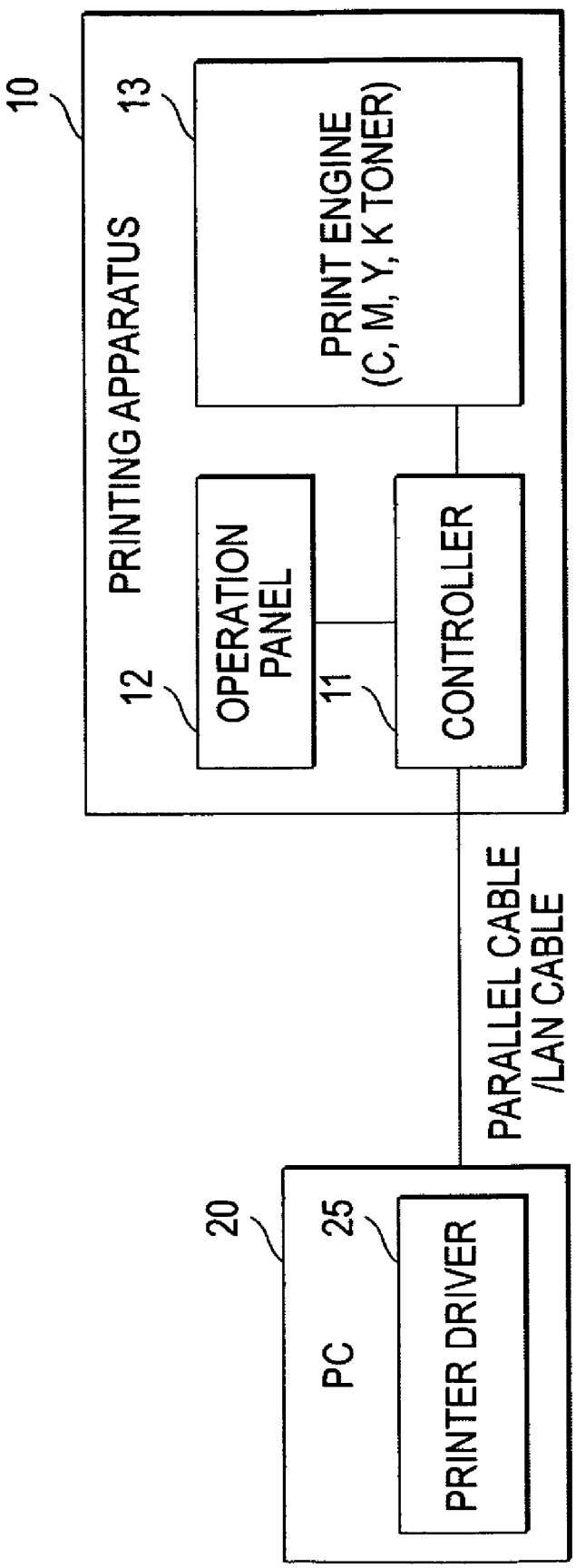
FIG. 1 is a block diagram showing a system including a printing apparatus according to a first embodiment of the invention.

As illustrated in FIG. 1, a printing apparatus 10 according to a first embodiment of the invention is an apparatus having a controller 11, an operation panel 12, and a print engine 13.

The operation panel 12 provided in the printing apparatus 10 is a unit formed from an LCD, a plurality of push-button switches, and the like; and serves as an interface between a user and the printing apparatus 10 (the controller 11).

The print engine 13 is a unit for performing color printing using C, M, Y, and K toner. Meanwhile, the print engine 13 is configured such that a single photosensitive member is provided for the four types of the toner. The print engine 13 is an engine which can perform monochrome printing so long as a K toner cartridge is mounted even when any or all of C, M, and Y toner cartridges are not mounted, The controller 11 is a unit for performing processing for causing the print engine 13 to produce a printed matter in accordance with received print data (detailed descriptions will be provided later), or performing processing for controlling the operation panel 12. Like a controller in a general printing apparatus, the controller 11 is formed from a CPU; a ROM; a RAM; an ASIC for performing image processing, and the like; a communications interface circuit for receiving print data; and the like.

The printing apparatus 10 is configured as an apparatus to be used while being connected to one or more personal computers (PC) 20 (a single PC 20 is illustrated in the drawing), on which a printer driver 25 is installed, by way of a network connection or a direct connection.

On the basis of the above description, the configuration and operations of the printing apparatus 10 according to the present embodiment will be described more specifically hereinbelow.

Print data generated by the PC 20 (the printer driver 25) and transmitted to the printing apparatus 10 include type data which indicate a type (a text, graphics, or an image) of an object with regard to each object to be printed on each page. In addition, the print data generated by the PC 20 and to be transmitted to the printing apparatus 10 include data formatted in accordance with the RGB system as data indicating colors (chromatic colors and achromatic colors) of the respective objects.

Figure 2:
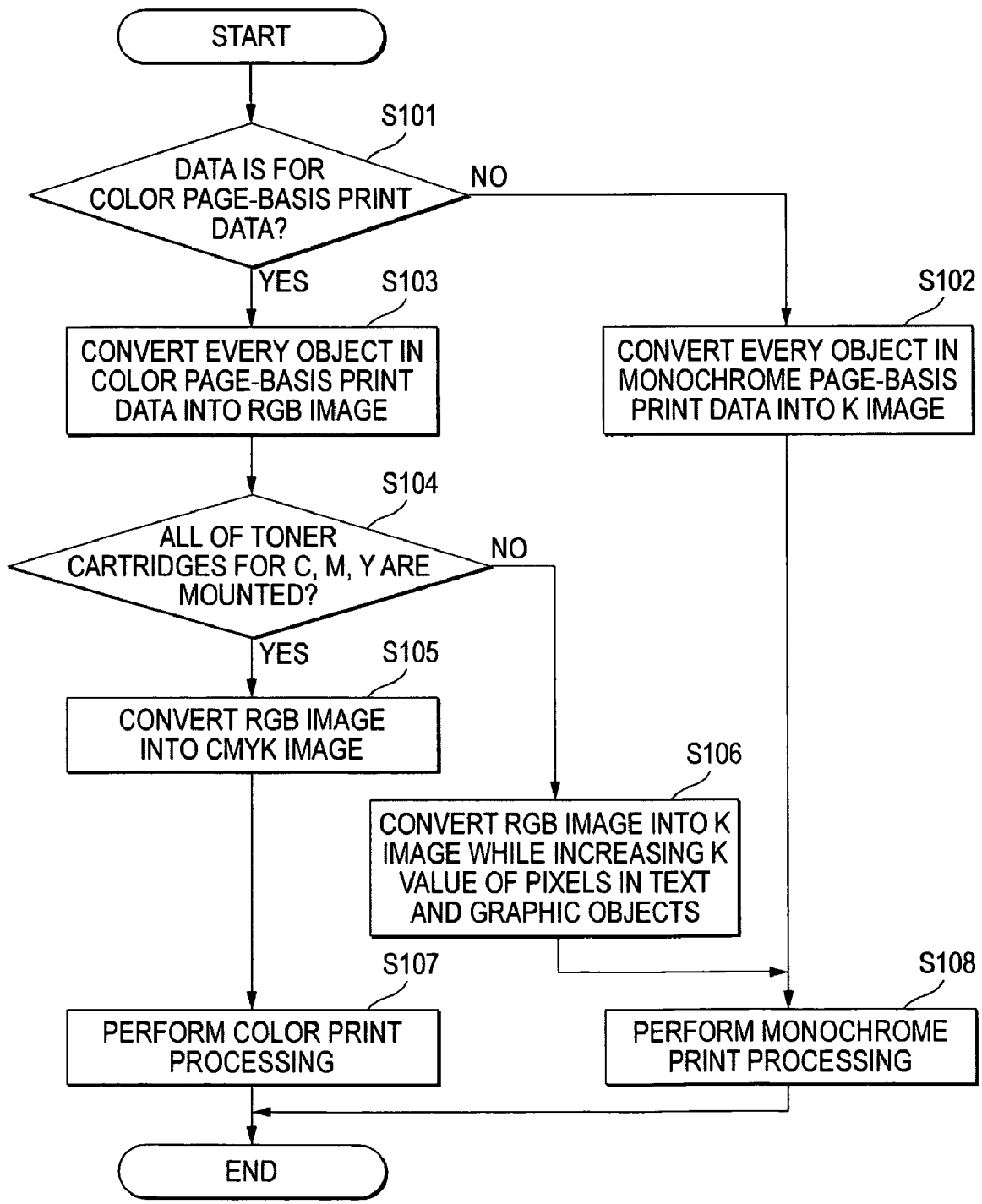
FIG. 2 is a flow chart showing a print processing executed in the printing apparatus of FIG. 1.

The controller 11 (the CPU and the ASIC) of the printing apparatus 10 is configured as a unit which, when the print data are transmitted from the PC 20, performs print processing with print data specified on a per-page basis, whose procedures are illustrated in FIG. 2, with regard to data of a single page included in the print data (hereinbelow, called "page-basis print data").

More specifically, upon receipt of the print data, the controller 11 first determines whether the page-basis print data to be processed are data which instruct printing of a color page (data including an object having a color in which at least one of RGB values is different) or data which instruct printing of a monochrome page (every object has a color in which all of RGB values are the same) (step S101). Hereinafter, the former data is referred to color page-basis print data and the latter data is referred to monochrome page-basis print data.

When the page basis print data to be processed are the monochrome page-basis print data (NO in step S101), there is performed processing for converting the respective objects in the monochrome page basis print data into K images with a monochrome color which is specified in the data (step S102). Thereafter, monochrome print processing for causing the print engine 13 to perform printing using only the K toner in accordance with the K image is performed (step S108).

Meanwhile, when the page-basis print data to be processed are the color page-basis print data (YES in step S101), processing for converting the respective objects in the color page-basis print data into an RGB image is performed (step S102). Meanwhile, the RGB image obtained through this processing include type date pertaining to an object serving as the source of the pixel, for each pixel.

After processing pertaining to step S103, a determination is made as to whether or not all of the C, M, and Y toner cartridges are mounted (step S104). When all of the C, M, and Y toner cartridges are mounted (YES in step S104), processing for converting the RGB image into a CMYK image is performed (step S105). Thereafter, color print processing for causing the print engine 13 to print using all of the four types of the toner in accordance with the CMYK image is performed (step S107).

When any or all of the C, M, and Y toner cartridges are not mounted (NO in step S104), there is performed processing for converting the RGB image obtained through processing pertaining to step S103 into a K image in such a manner as to increase K values of respective pixels pertaining to text objects and graphics objects so as to be larger than K values of pixels pertaining to image objects in the same color (step S106). Subsequently, monochrome print processing in accordance with the K image is performed (step S108). Meanwhile, processing pertaining to step S106 is for converting an RGB image into a K image in such a manner that the degree of increasing the K value becomes greater when the color to be converted is paler (i.e., having a smaller K value).

The printing apparatus 10 is configured as an apparatus which performs processing as described above for respective page-basis data sets in print data.

By virtue of this configuration, as schematically illustrated in FIG. 3, in a monochrome printed matter printed by the printing apparatus 10 in accordance with color page-basis print data, texts of respective colors are printed in a more-easily-readable form as compared with those in a monochrome printed matter printed by a conventional printer. In addition, although not illustrated, a printing result of a graphic image in a pale color produced by the printing apparatus 10 is more easily recognizable as compared with a printing result produced by the conventional printer.

Next, a second embodiment of the invention will be described.

Figure 4:
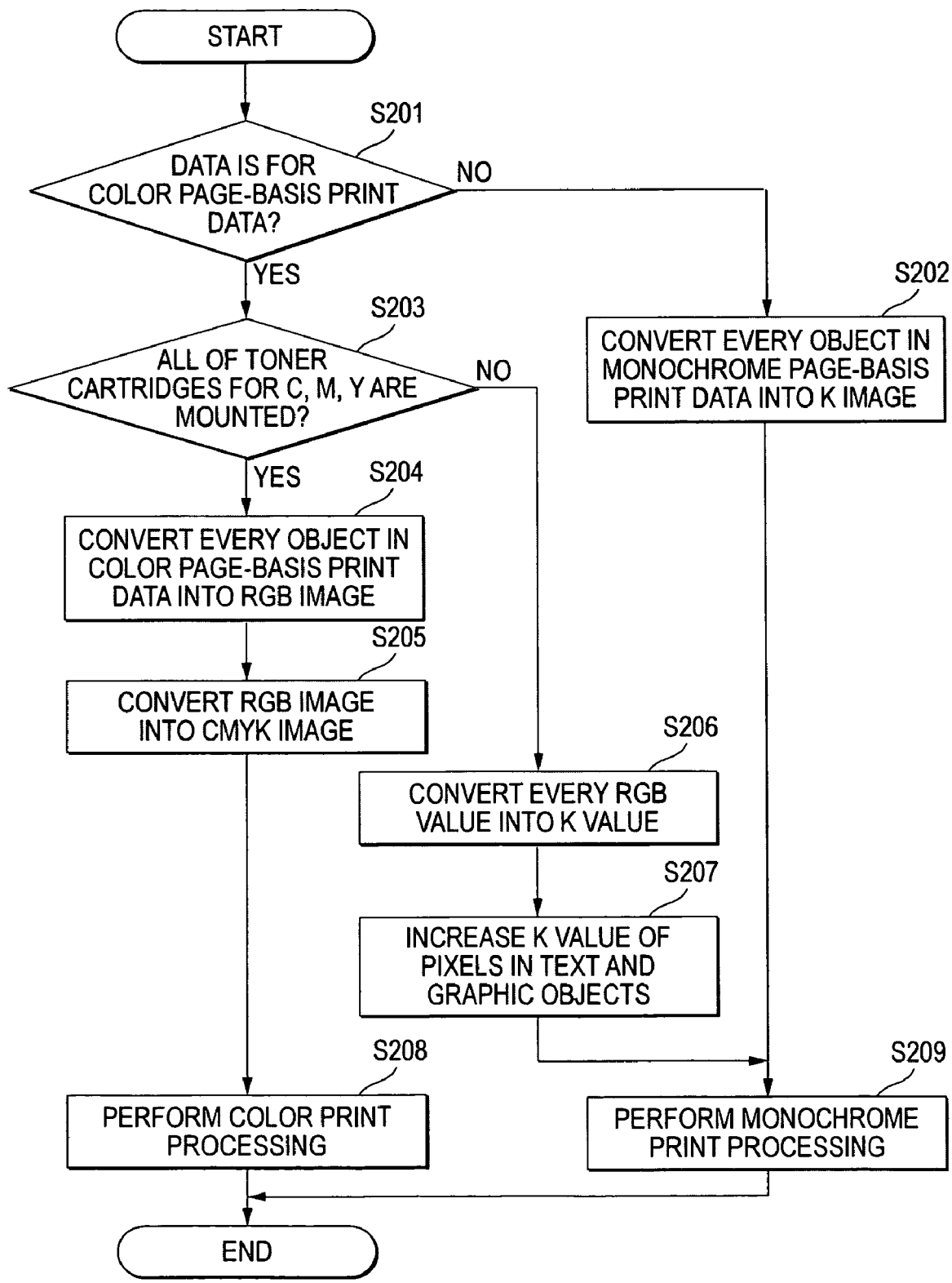
FIG. 4 is a flow chart showing a print processing executed in a printing apparatus according to a second embodiment of the invention.

In this embodiment, the controller 11 is configured so as to perform print processing as illustrated in FIG. 4. Any others are the same as in the first embodiment and repetitive explanations for those will be omitted.

More specifically, upon receipt of print data, first, the controller 11 determines whether the page-basis print data to be processed are color page-basis print data or monochrome page-basis print data (step S201).

When the page-basis print data to be processed are the monochrome page-basis print data (NO in step S201), there is performed processing for converting the respective objects in the monochrome page-basis print data into a K image with a monochrome color specified in the data (step S202). Thereafter, monochrome print processing for causing the print engine 13 to perform printing using only the K toner in accordance with the K image is performed (S209).

Meanwhile, when the page-basis print data to be processed are the color page-basis print data (YES in step S201), a determination is made as to whether or not all of the C, M, and Y toner cartridges are mounted (step S203). When all of the C, M, and Y toner cartridges are mounted (YES in step S203), processing for converting the respective objects in the color page-basis print data into an RGB image is performed (step S204). The thus-obtained RGB image is converted into a CMYK image (step S205). Thereafter, color print processing using the CMYK image is performed (step S208).

When any or all of the C, M, and Y toner cartridges are not mounted (NO in step S203), there is performed processing for converting RGB values of respective objects in the page-basis print data to be processed (in this case, the color page-basis print data) into K values in accordance with the above-described equations (1) and (2). Thereafter, there are performed processing of converting the K values into a K image while performing logic-operational rendering on a per rendering-object basis (step S206); and processing for increasing K values at positions corresponding to pixels of texts and graphics in the K image so as to be larger than K values at positions corresponding to pixels of image objects in the same color (step S207). Meanwhile, this processing pertaining to step S207 is, as in the case of the processing pertaining to step S106, such processing for converting an RGB image into a K image in such a manner that the degree of increasing the K value becomes greater when the color to be converted is paler (i.e., having a smaller K value).

After completion of the processing pertaining to step S207, monochrome print processing using the K image obtained thorough the processing is performed (step S208).

Next, a third embodiment of the invention will be described. Components similar to those in the first embodiment will be designated by the same reference numerals and repetitive explanations for those will be omitted.

Figure 5:
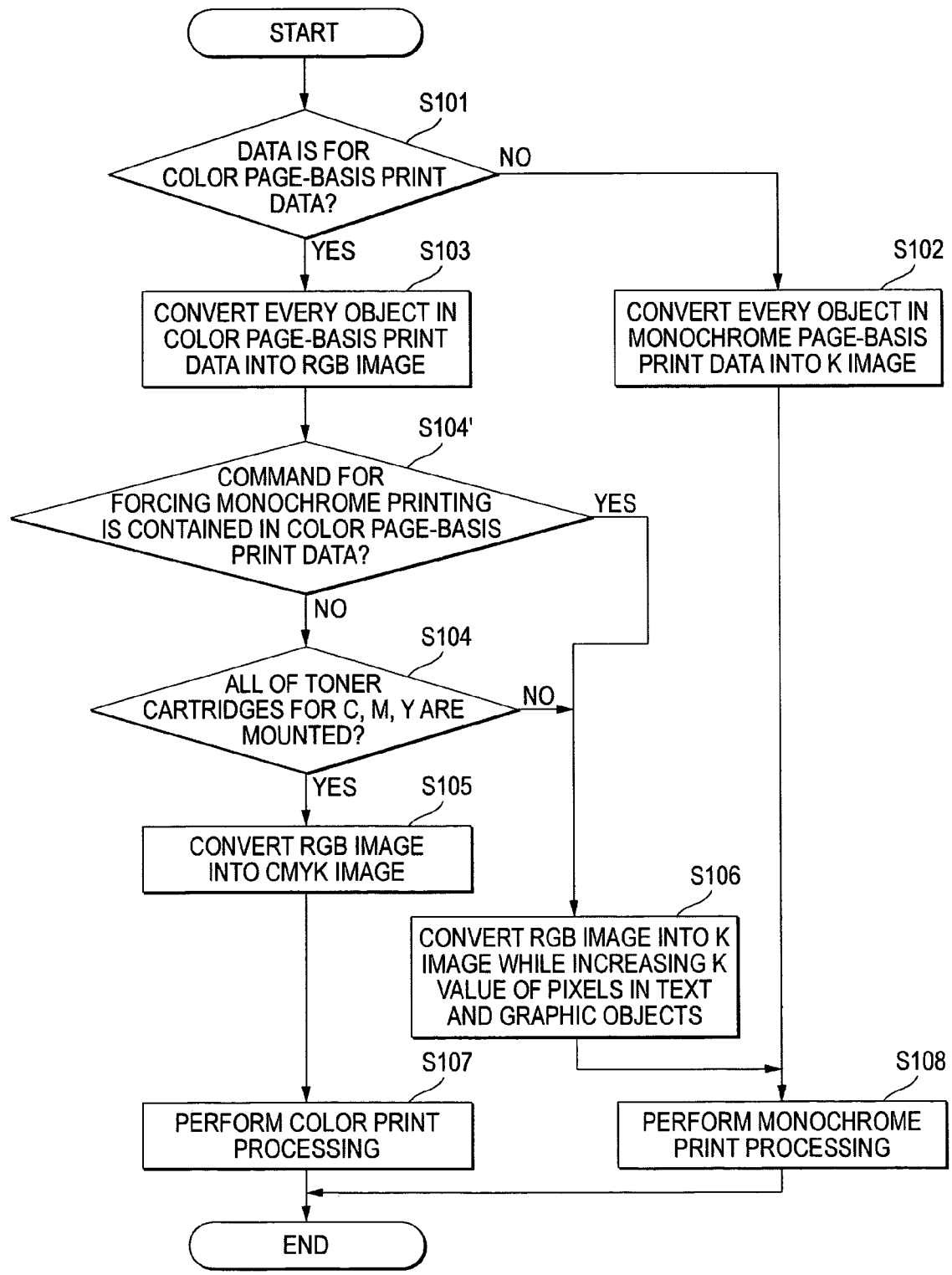
FIG. 5 is a flow chart showing a print processing executed in a printing apparatus according to a third embodiment of the invention.

In this embodiment, the printer driver 25 is configured so as to generate and transmit print job data including a command for forcing the printing apparatus 10 to perform monochrome printing when an instruction to do so is provided by a user, and the controller 11 is configured so as to perform print processing as illustrated in FIG. 5.

Specifically, when such a command is included in page-basis print data, even if all of the C, M, and Y toner cartridges are mounted, It is executed processing for increasing K values of respective pixels (step S104').

Figure 6:
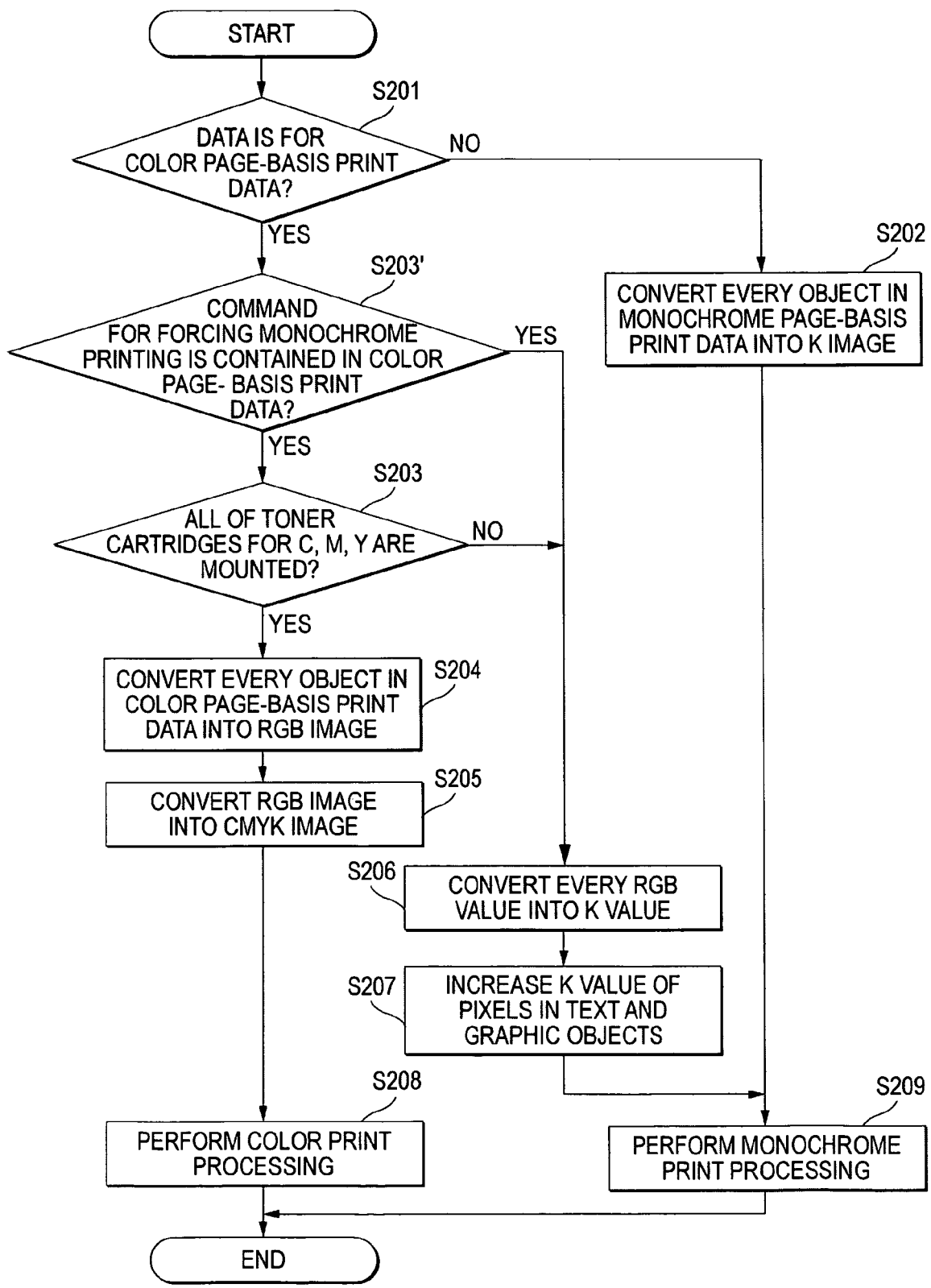
FIG. 6 is a flow chart showing a print processing executed in a printing apparatus according to a fourth embodiment of the invention.

As a fourth embodiment of the invention, this configuration may be applied to the printing apparatus of the second embodiment as shown in FIG. 6 (step S203').

In the above embodiments, the printing apparatus 10 is configure to print text objects and graphics objects in darker colors. However, the printing apparatus 10 may be modified to print only text objects in darker colors.

A monochrome laser printer or a color/monochrome copier may be manufactured on the basis of the technique employed in each of the above embodiments.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A printing apparatus, adapted to receive print data specifying a color of an object to be printed with RGB values and specifying a type of the object as one of a text object, a graphic object and an image object, the printing apparatus comprising:
   a print processor, operable to generate black image data from a set of the print data for one page, such that a black density value for one color of at least the text object is made greater than a black density value for the one color of the image object; and
   a print engine, operable to perform monochrome printing with black toner in accordance with the black image data.

2. The printing apparatus as set forth in claim 1, wherein:
   the print engine Is operable to perform color printing with cyan toner, magenta toner, yellow toner and the black toner; and
   the monochrome printing is performed when a prescribed condition is satisfied.

3. The printing apparatus as set forth in claim 2, wherein the prescribed condition is that at least one of the cyan toner, the magenta toner and the yellow toner is not available.

4. The printing apparatus as set forth in claim 1, wherein the black image data is generated such that a black density value for one color of the graphic object is made greater than the black density value for the one color of the image object.

5. The printing apparatus as set forth in claim 1, wherein the print processor generates RGB image data including information indicative of the type of the object for every pixel, prior to the generation of the black image data.

* * * * *